United States Patent [19]

Way

[11] Patent Number: 4,740,732

[45] Date of Patent: Apr. 26, 1988

[54] ADAPTIVE REWIND FOR TAPE DRIVE

[75] Inventor: Peter Way, Fort Collins, Colo.

[73] Assignee: Hewlett-Packard Company, Palo Alto, Calif.

[21] Appl. No.: 903,340

[22] Filed: Sep. 3, 1986

[51] Int. Cl.$^4$ ............................................. H02P 7/68
[52] U.S. Cl. ..................................................... 318/7
[58] Field of Search ................. 318/6, 7, 98, 105–109, 318/342; 242/75.44, 75.5, 75.51; 360/73

[56] References Cited

U.S. PATENT DOCUMENTS

| | | | |
|---|---|---|---|
| 3,551,775 | 12/1970 | Safiuddin | 318/98 X |
| 3,606,201 | 9/1971 | Petusky | 318/7 X |
| 3,704,401 | 11/1972 | Miller | 318/7 |
| 3,805,127 | 4/1974 | Svendsen | 318/7 X |
| 4,015,799 | 4/1977 | Koski et al. | 318/7 X |
| 4,227,129 | 10/1980 | Brooks | 318/471 X |
| 4,502,647 | 3/1985 | Zweighaft et al. | 318/7 X |

FOREIGN PATENT DOCUMENTS

| | | | |
|---|---|---|---|
| 59-226695 | 12/1984 | Japan | 318/7 |
| 0851714 | 7/1981 | U.S.S.R. | 318/7 |

Primary Examiner—Bentsu Ro
Attorney, Agent, or Firm—Jeffery B. Fromm

[57] ABSTRACT

An adaptive rewind system is described for use in tape drive apparatus or other apparatus involving roll goods which are movable between a supply reel and a take-up reel. The system includes (1) comparison means for (a) comparing the voltage at the motor driving the supply reel to a supply reference voltage, and (b) comparing the voltage at the motor driving the take-up reel to the supply reference voltage, and (2) control means adapted to maximize the velocity of the roll goods while being wound from one reel to the other. The control means is adapted to drive at least one of the motors with a voltage essentially equal to the supply reference voltage, while the voltage at the other motor does not exceed the supply reference voltage.

12 Claims, 2 Drawing Sheets

ADAPTIVE REWIND FOR TAPE DRIVE

FIELD OF THE INVENTION

This invention relates to drive apparatus (e.g., tape drives for magnetic tape). More particularly, this invention relates to magnetic tape drives such as those utilized with computers and other data processing equipment. Even more particularly this invention relates to magnetic tape drives which are adapted to utilized large tape reels which must be rewound after each use.

BACKGROUND OF THE INVENTION

Magnetic tape drives which utilize large reels of magnetic tape (e.g., 0.5 inch wide tape having a length of 2400 or 3600 feet) typically include DC motors for powering the supply reel and the take-up reel. Such DC motors require a voltage which is porportional to the linear velocity of the magnetic tape in addition to the voltage required to drive current through the armature of the motor. As a result, for a fixed rewind tape velocity, the DC motors require a changing voltage as the tape rewinds from the end of the tape to the beginning of the tape. The change of voltage during rewinding of a 0.5 inch tape drive is roughly 2:1 since this is the total radius change.

Thus, in conventional tape drive systems, the voltage to each of the reel motors changes as tape is wound from one reel to the other (e.g., during rewinding operation) when the tape velocity remains fixed.

The rewind time for a magnetic tape which is 2400 feet long is two minutes in conventional tape drive apparatus. The rewind time for a magnetic tape which is 3600 feet long is three minutes in such apparatus.

SUMMARY OF THE PRESENT INVENTION

In accordance with the present invention there is provided an improvement to tape drive apparatus or the like of the type having a supply reel and a take-up reel which are each driven by separate electrical motors. The improvement comprises:
  (a) comparison means which is adapted to compare the voltage at the motor driving the supply reel to a supply reference voltage, and which is further adapted to compare the voltage at the motor driving the take-up reel to the supply reference voltage; and
  (b) control means adapted to maximize the velocity of the tape while being wound from one reel to the other reel by driving at least one of the electrical motors with a voltage essentially equal to the supply reference voltage; wherein the voltage at the other electrical motor does not exceed the supply reference voltage.

The system of this invention significantly reduces the time required to wind the tape from one reel to the other (e.g., either during rewind from the take-up reel to the supply reel, or in winding the tape forwardly from the supply reel to the take-up reel). For example, the rewind time for a 2400 foot reel of magnetic tape may be shortened to 90 seconds using the system of this invention as compared to 120 seconds in conventional apparatus.

The system of the invention significantly shortens the winding time of roll goods from one reel to the other by varying the velocity while utilizing all of the available voltage.

The system of this invention is also adaptable to other types of winding apparatus also. For example, it may be useful in conjunction with winding apparatus for roll goods such as wire, paper, sheet metal, cloth, plastic, ribbon, etc. where both the supply reel and the take-up reel are driven by electrical motors. The various types of roll goods may be generally referred to as either webs or filaments.

BRIEF DESCRIPTION OF THE DRAWINGS

The invention is described in more detail hereinafter with reference to the accompanying drawings, wherein like reference characters refer to the same parts throughout the several views and in which.

DETAILED DESCRITION OF THE INVENTION

Figure 1:
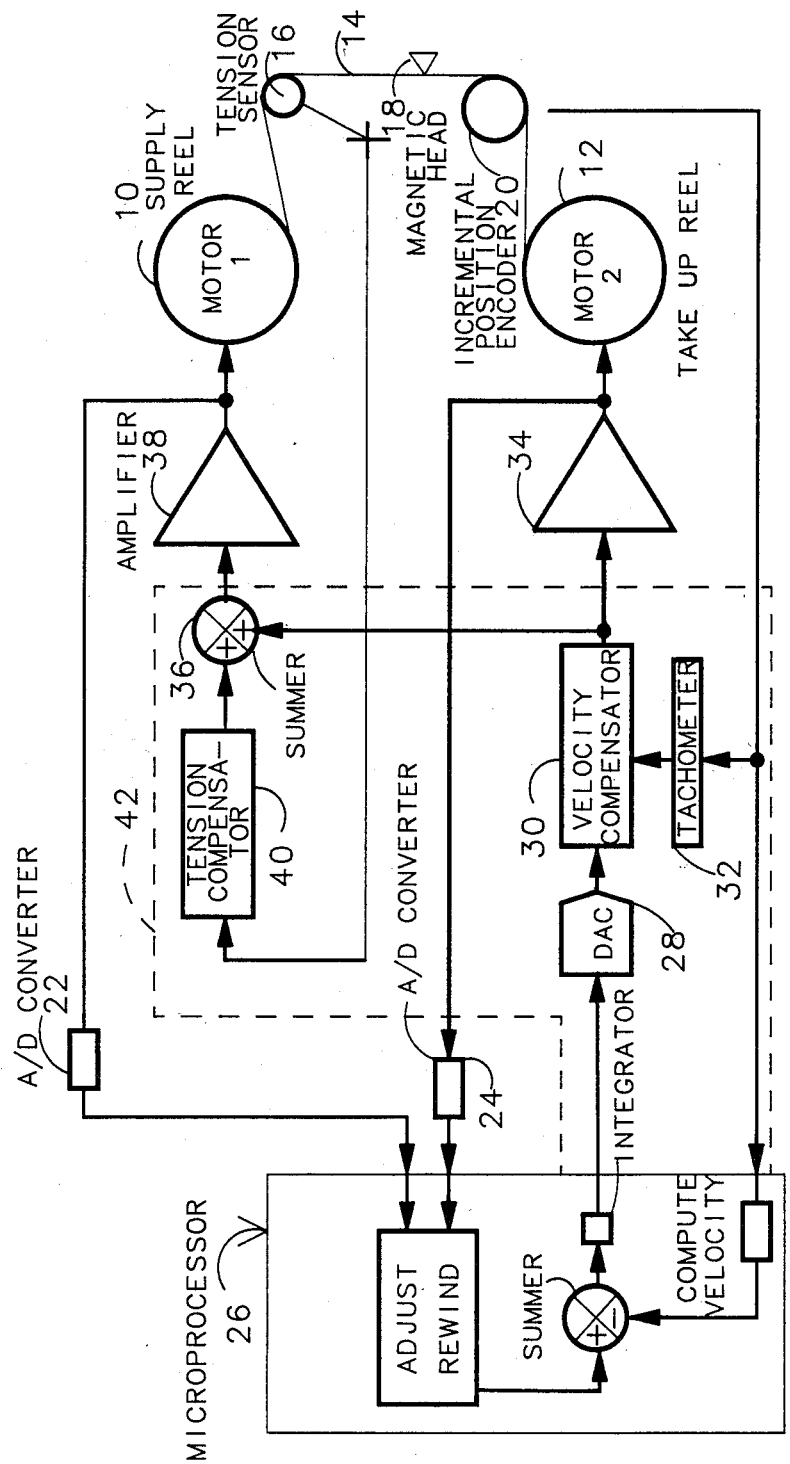
FIG. 1 is a block diagram of a preferred embodiment of a tape drive system of this invention.

In FIG. 1 there is shown a block diagram of a preferred embodiment for a tape drive apparatus which includes the rewind system of this invention. Thus, there is illustrated a tape drive apparatus which includes a supply reel 10 and a take-up reel 12. Each reel is driven by an electrical motor (typically a DC motor). Magnetic tape 14 extends from the supply reel 10, over a tension sensor 16, past magnetic head 18, over a tape incremental position encoder 20 and then onto take-up reel 12. The magnetic tape 14 may be wound from the supply reel 10 onto the take-up reel 12 or, alternatively, from the take-up reel 12 to supply reel 10.

For purposes of discussion of the system of the invention hereafter, all voltages are referred to as being positive voltages.

When it is desired to wind the tape from one reel to the other reel as rapidly as possible (e.g., during a rewind operation), the voltages to the respective motors driving reels 10 and reel 12 are monitored (e.g., by analog-to-digital converters 22 and 24, respectively). These voltage signals are communicated to microprocessor 26. The velocity of the moving tape 14, as measured or monitored by incremental position encoder 20, is also communicated to microprocessor 26. The larger of the voltages at the electrical motors driving the supply reel and take-up reel is compared to a supply reference voltage (e.g., 45 volts or any predetermined voltage value which is available to the drive system). The supply reference voltage represents the motor voltage supply (e.g., 48 volts) less enough voltage to overcome noise in the system (e.g., 3 volts). A value for the supply reference voltage is chosen such that any A.C. or noise component of the motor voltage will not exceed the motor voltage supply. A.C. or noise components of the motor voltage are typically the result of eccentric tape reels, motor brush commutation, and tape friction, for example.

If the voltage of either motor exceeds this supply reference voltage, then the microprocessor 26 reduces or decreases the velocity command which is communicated to the servo means controlling the motor. This velocity command is first converted to an analog signal via digital-to-analog converter 28, after which it proceeds to a velocity compensator 30. The signal from the position encoder 20 is communicated to a tachometer 32 which converts the signal from encoder 20 to a voltage signal. This value is combined with the signal from the converter 28 at velocity compensator 30.

In effect the velocity command from the microprocessor 26 results in a minor adjustment to the voltage driving the electrical motors for the take-up reel 12 and supply reel 10. The new voltage signal is amplified by amplifier 34, after which it is received by the servo for the motor driving reel 12. Preferably (although not required) the new voltage signal is also added to the voltage to the motor driving supply reel 10 via summer 36 and amplifier 38, as illustrated.

If the voltage at either motor exceeds the supply reference voltage, then the velocity command to the motor is reduced. Conversely, if less than all the available voltage is being utilized, then the velocity command is increased. Another way of stating this is that if the velocity of the tape is increased then the voltage requirement at the motors is increased. If the velocity of the tape is decreased, then the voltage requirement at the motors is decreased.

The tension sensor 16 operates in conventional fashion and communicates with tension compensator 40 which is capable of adjusting the voltage driving reel 10 to maintain the desired tension in tape 14 between reel 10 and reel 12.

The adaptive rewind system of this invention may be used in conjunction with reel-to-reel tapes and with tape cartridges, if desired.

Figure 2:
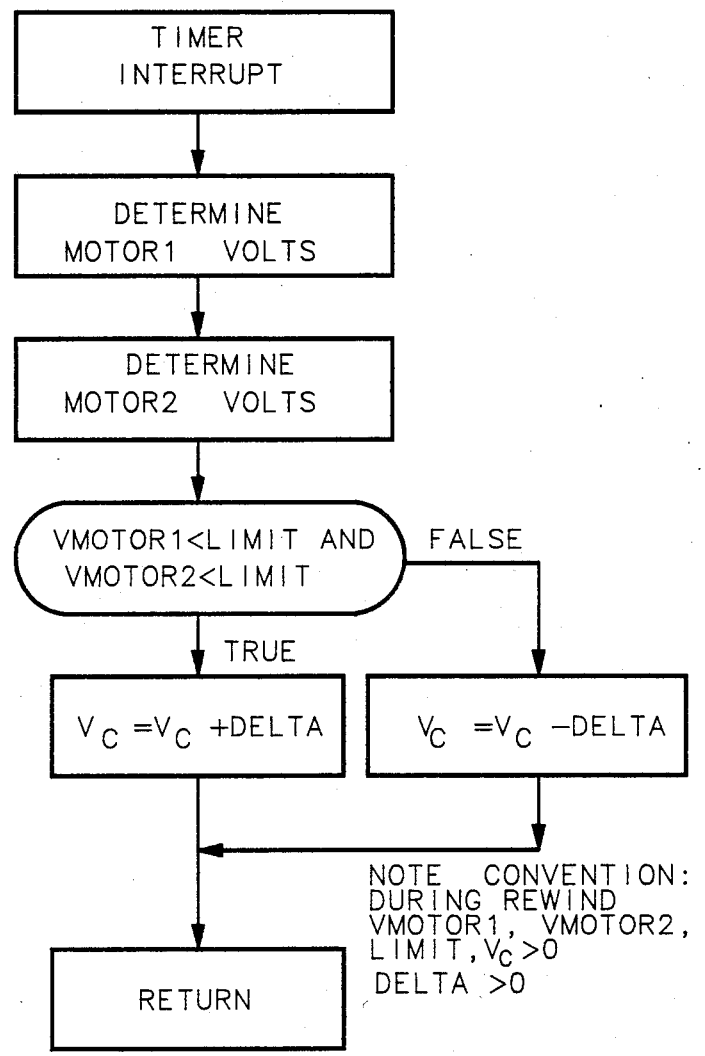
FIG. 2 is a flow chart illustrating the logic of a microprocessor used in the system of this invention.

FIG. 2 is a flow chart illustrating the logic of the microprocessor 26 used in the system of this invention. The timer interrupt refers to periodic sampling of the voltages at the first and second electrical motors driving the supply reel 10 and the take-up reel 12. The voltage at each such motor is determined at short intervals (e.g., every few milliseconds). The microprocessor 26 then compares the voltage at each motor to the "limit" which is the predetermined supply reference voltage for the system.

If the voltage at both of the motors is less than the supply reference voltage, then the velocity command is increased by a small increment. If the voltage at one of the motors exceeds the supply reference voltage, then the velocity command is decreased by a small increment. In this manner the microprocessor 26 assures that the velocity of the tape while being wound from one reel to the other is maximized by driving at least one of the motors with a voltage essentially equal to the supply reference voltage, while neither motor exceeds the supply reference voltage.

In another embodiment of the system of the invention a microprocessor may be used to perform all of the functions of microprocessor 26 plus those contained within the boundaries of dotted line 42 in FIG. 1.

What is claimed is:

1. A tape drive apparatus of the type having a supply reel for magnetic tape driven by a first electrical motor and a take-up reel driven by a second electrical motor, wherein a motor voltage supply is available to drive said electrical motors, the improvement comprising:
   (a) comparison means adapted to compare the voltage at said first motor to a supply reference voltage, and further adapted to compare the voltage at said second motor to said supply reference voltage; and
   (b) control means responsive to the comparison means and adapted to maximize the velocity of said tape while being wound from one said reel to the other said reel by driving at least one of said electrical motors with a voltage essentially equal to said supply reference voltage; wherein the voltage at the other said electrical motor does not exceed said supply reference voltage.

2. Tape drive apparatus in accordance with claim 1, wherein said voltages at said first and second electrical motors are monitored by analog-to-digital converters.

3. Tape drive apparatus in accordance with claim 2, wherein said control means comprises a processor operative for generating a velocity command which is adapted to adjust said voltage at said first and second motors in response to said comparison means.

4. Tape drive apparatus in accordance with claim 3, wherein said processor is adapted to increase said velocity command when the voltage at each of said first and second electrical motors is less than said supply reference voltage.

5. Tape driven apparatus in accordance with claim 3, wherein said processor is adapted to decrease said velocity command when the voltage at either of said electrical motors exceeds said supply reference voltage.

6. In drive apparatus of the type having a supply reel for roll goods driven by a first electrical motor and a take-up reel driven by a second electrical motor, wherein a motor voltage supply is available to drive said electrical motors, the improvement comprising:
   (a) comparison means adapted to compare the voltage at said first motor to a supply reference voltage, and further adapted to compare the voltage at said second motor to said supply reference voltage; and
   (b) control means responsive to the comparison means and adapted to maximize the velocity of said roll goods while being wound from one said reel to the other said reel by driving at least one of said electrical motors with a voltage essentially equal to said supply reference voltage; wherein the voltage at the other said electrical motor does not exceed said supply reference voltage.

7. Drive apparatus in accordance with claim 6, wherein said voltages at said first and seocnd electrical motors are monitored by analog-to-digital converters.

8. Drive apparatus in accordance with claim 6, wherein said roll goods comprise a filament.

9. Drive apparatus in accordance with claim 6, wherein said roll goods comprise a web.

10. Drive apparatus in accordance with claim 7, wherein said control means comprises a processor operative for generating a velocity command which is adapted to adjust said voltage at said frist and second motors in response to said comparison means.

11. Drive apparatus in accordance with claim 10, wherein said processor is adapted to increase sad velocity command when the voltage at both of said first and second electrical motors is less than said supply reference voltage.

12. Drive apparatus in accordance with claim 10, wherein said processor is adapted to decrease said velocity command when the voltage at either of said electrical motors exceeds said supply reference voltage.

* * * * *